(12) United States Patent
Siebers et al.

(10) Patent No.: US 7,207,582 B2
(45) Date of Patent: Apr. 24, 2007

(54) UNIVERSAL MOUNTING SYSTEM

(75) Inventors: Philippus Maria Antonius Siebers, Strampoy (NL); Maxim Wilhelmus Josefus Hartman, Apeldoorn (NL); Antonie Cornelis Pruim, Zwolle (NL); Heinrich Johannes Elbrink, Emmeloord (NL)

(73) Assignee: Oshkosh Truck Corporation, Oshkosh, WI (US)

( * ) Notice: Subject to any disclaimer, the term of this patent is extended or adjusted under 35 U.S.C. 154(b) by 262 days.

(21) Appl. No.: 10/910,252

(22) Filed: Aug. 2, 2004

(65) Prior Publication Data

US 2006/0021541 A1  Feb. 2, 2006

(51) Int. Cl.
*B62D 21/00* (2006.01)

(52) U.S. Cl. ............................. 280/124.109; 298/19 R; 414/546

(58) Field of Classification Search ......... 280/124.109, 280/781, 795, 782, 783, 149.2; 298/19 R, 298/22 R, 22 C, 22 P; 414/546; 180/311
See application file for complete search history.

(56) References Cited

U.S. PATENT DOCUMENTS

| | | | | |
|---|---|---|---|---|
| 1,278,460 A | * | 9/1918 | Hanger | ..................... 298/19 R |
| 2,628,127 A | * | 2/1953 | Palsgrove et al. | ........ 298/19 R |
| 2,892,312 A | | 6/1959 | Allen et al. | |
| 3,003,262 A | | 10/1961 | De Biasi | |
| 3,146,839 A | * | 9/1964 | Carlson | ....................... 177/136 |
| RE25,702 E | | 12/1964 | De Biasi | |
| 4,715,767 A | | 12/1987 | Edelhoff et al. | |
| 5,632,509 A | | 5/1997 | Reichert | |
| 5,836,657 A | * | 11/1998 | Tilley et al. | ................. 298/1 A |
| 5,954,470 A | | 9/1999 | Duell et al. | |
| 6,109,684 A | * | 8/2000 | Reitnouer | ................. 296/184.1 |
| 6,270,153 B1 | * | 8/2001 | Toyao et al. | ................. 296/204 |
| 6,527,494 B2 | * | 3/2003 | Hurlburt | ..................... 414/482 |

FOREIGN PATENT DOCUMENTS

| | | |
|---|---|---|
| BE | 1013261 A6 | 11/2001 |
| DE | 35 12937 A1 | 10/1986 |
| DE | 100 40 018 A1 | 3/2001 |
| EP | 0 849 573 A2 | 6/1998 |
| EP | 1 559 662 A1 | 8/2005 |
| GB | 2 355 972 A | 5/2001 |
| NL | 1018289 | 4/2002 |

* cited by examiner

*Primary Examiner*—Paul N. Dickson
*Assistant Examiner*—Drew J. Brown
(74) *Attorney, Agent, or Firm*—Foley & Lardner LLP

(57) ABSTRACT

A sub frame assembly for attaching a material container to different vehicles each having a first and second generally parallel chassis member wherein the chassis members of the different vehicles have different spacings. The sub frame assembly comprises at least one frame rail associated with each chassis rail, at least a first and second cross member attached to the frame rails to hold the frame rails in a generally fixed relationship, wherein the cross members space the frame rails at a distance which corresponds to the chassis frame spacing of a respective vehicle.

36 Claims, 15 Drawing Sheets

UNIVERSAL MOUNTING SYSTEM

BACKGROUND

The present invention relates to vehicles for hauling materials such as garbage trucks. In particular, the present invention relates to a universal mounting system which permits the efficient mounting of a material container such as a refuse body onto a range of truck chassis having different characteristics such as frame rail spacing.

Many material handling containers which are mounted on heavy trucks require a sub frame which is attached to the frame rails of the truck chassis. For example, the refuse bodies for garbage trucks and waste hauling trucks are mounted upon a sub frame which is attached to the frame rails of the associated truck. Similarly, dump truck boxes may include sub frames mounted to the frame rails of the truck to support the dump box. Oftentimes, the sub frame is utilized to provide an appropriate support for the associated material body. This support serves to prevent deformation and damage to the body when the vehicle chassis deforms (e.g. twisting of the frame rails relative to each other) during vehicle operation. The sub frame can also be mounted on the vehicle frame to help reduce frame deformation. In many cases, truck manufacturers are reluctant to allow point loads onto the chassis, especially severe point loads along the rear parts of the frame rails because of the potential for damage. Similarly, front mounts can cause severe bending loads over the length of the chassis.

Referring to the truck chassis, in many commercial transactions for waste hauling trucks, the manufacturers of material handling containers are not the manufacturers of the truck chassis. For example, many municipalities waste management companies dictate the chassis manufacturer of the truck chassis to be used with a particular container or refuse body. Examples of truck chassis manufacturers include DAF, IVECO, Volvo, Scania, Mercedes-Benz, Dennis Eagle Ltd., MAN, Renault, and Seddon Atkinson. A major problem encountered by container and waste body manufacturers is the differences in the frames of the truck chassis sold by various suppliers. More specifically, the distance between chassis frame rails, the rigidity of the frames and the shape of the frame rails varies between supplier. As a result, the manufacturers of bodies are required to manufacture a different sub frame for every different chassis demanded by its material container customers.

To compound these problems, container load or weight monitoring is becoming a requirement for waste hauling trucks. In particular, the weight and change in weight of the container is monitored by locating electronic load cells between the waste body and the sub frame. With this arrangement, the load cells are in a position to generate signals representative of the weight of the waste body and contents on demand. However, the interpositioning of load cells between the sub frame and bodies increases the height of the body which can result in a number of disadvantages. For example, the increased height may increase the access height for loading and unloading the body. In addition, the increased height often raises the center of gravity of the overall vehicle which can reduce the overall stability of the vehicle. Another problem is that the increased height may result in driving limitations in countries and other locations that impose height restrictions for certain vehicles. Further, an increased height can sometimes lead to problems in actually lifting a container.

In view of these problems, it would be desirable to provide a sub frame where all or substantially all of the components thereof could be universally used with a broad range of different truck chassis. Additionally, it would be desirable to provide an arrangement which permits the use of load cells without increasing the height of the associated material container the full height of the load cell.

It would be advantageous to provide a system or the like of a type disclosed in the present application that provides any one or more of these or other advantageous features. The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

SUMMARY

The present invention relates to a vehicle comprising at least one driven axle and wheel assembly, a motor coupled to the at least one axle for driving the at least one axle, a chassis having at least two generally parallel chassis rails supported relative to the at least one axle, at least one sub frame unit having at least one frame rail associated with each chassis rail, the at least one sub frame unit comprising at least one cross member attached to the frame rails to hold the frame rails in a generally fixed relationship to rest upon the chassis rails, and a container configured to contain material attached to the at least one sub frame unit by way of the cross members, wherein the at least one sub frame rail is attached to the chassis rails to permit desired motion of the chassis rails during operation.

The present invention further relates to a material hauling vehicle. The vehicle comprises at least one driven axle and wheel assembly, a motor coupled to the axle for driving the axle, a chassis having at least two generally parallel chassis rails supported relative to the axle, a sub frame having at least one frame rail associated with each chassis rail, at least a first adjustable cross member attached to the frame rails to hold the frame rails in a generally fixed relationship to rest upon the chassis rails, and a container configured to contain material attached to the sub frame, wherein the frame rails are attached to the chassis rails to permit transportation of the container by the vehicle and also generally permit desired motion of the chassis rails during operation of the vehicle.

The present invention also relates to a sub frame assembly for attaching a material container to different vehicles each having a first and second generally parallel chassis member wherein the chassis members of the different vehicles have different spacings. The sub frame assembly comprises at least one frame rail associated with each chassis rail, at least a first and second cross member attached to the frame rails to hold the frame rails in a generally fixed relationship, wherein the cross members space the frame rails at a distance which corresponds to the chassis frame spacing of a respective vehicle, first and second container mounts supported on the outside of the frame rails at the outboard ends of the first cross member, and third and fourth container mounts supported on the outside of the frame rails at the outboard ends of the second cross member, wherein the container is attachable to the associated vehicle at the mounts.

The present invention also relates to a method for producing an adjustable sub frame assembly for attaching a material container to different vehicles each having a chassis with a different spacing between a first chassis rail and a second chassis rail. The method comprises providing a first frame rail and a second frame rail associated with the first chassis rail and the second chassis rail, providing a first cross member and a second cross member attached to the first frame rail and the second frame rail, providing a first mount and a second mount on an outer portion of the first frame rail for supporting the container, providing a first mount and a second mount on an outer portion of the second frame rail for supporting the container, and configuring the first cross member and the second cross member to hold the first frame rail and the second frame rail in a generally fixed relationship and adjustably space the first frame rail and the second frame rail at a distance that corresponds to the spacing between the first chassis rail and the second chassis rail.

DETAILED DESCRIPTION

Figure 1A:
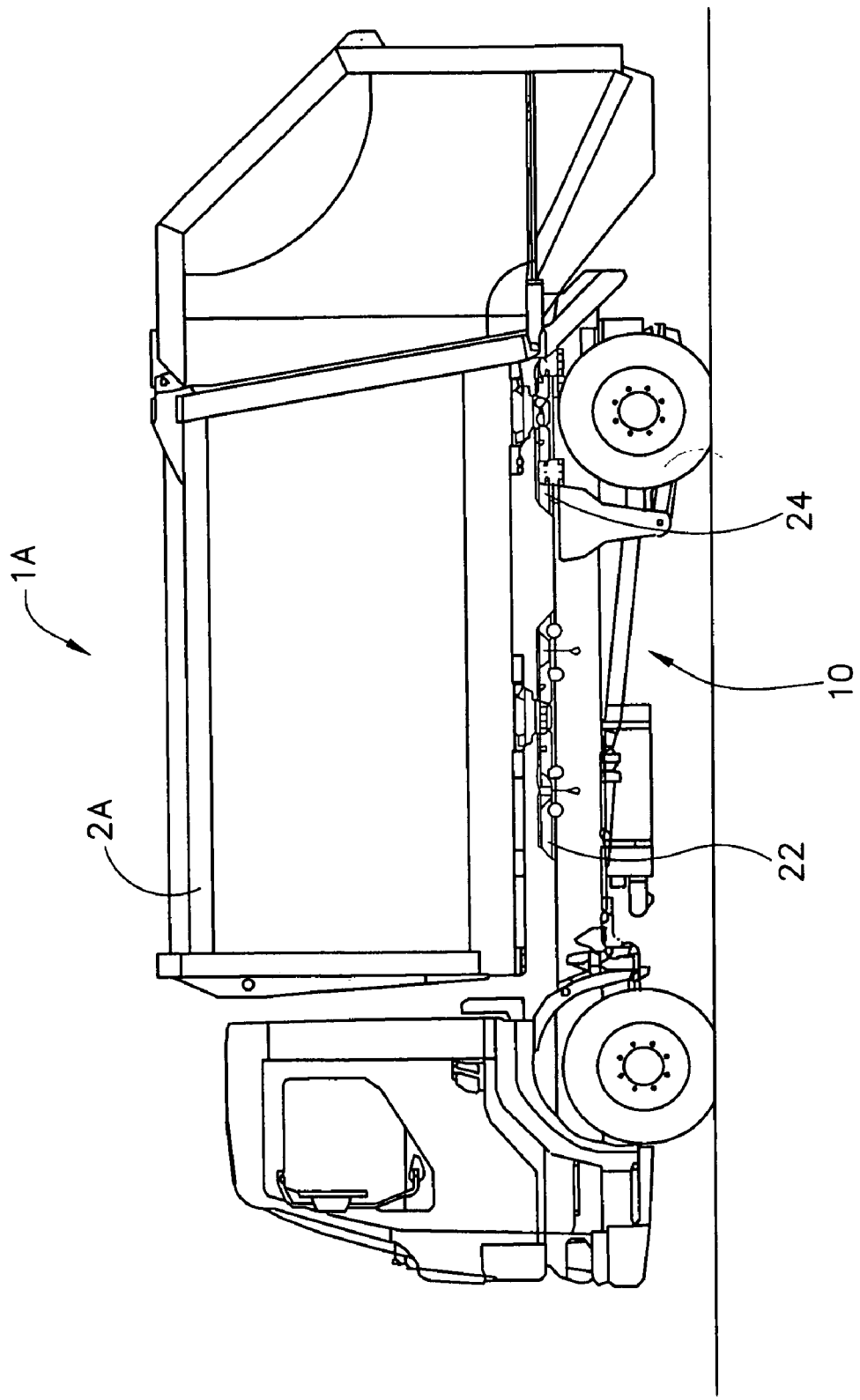
FIG. 1A is a side view of a front and rear sub assembly coupled to a vehicle chassis and container according to an exemplary embodiment.
Figure 1B:
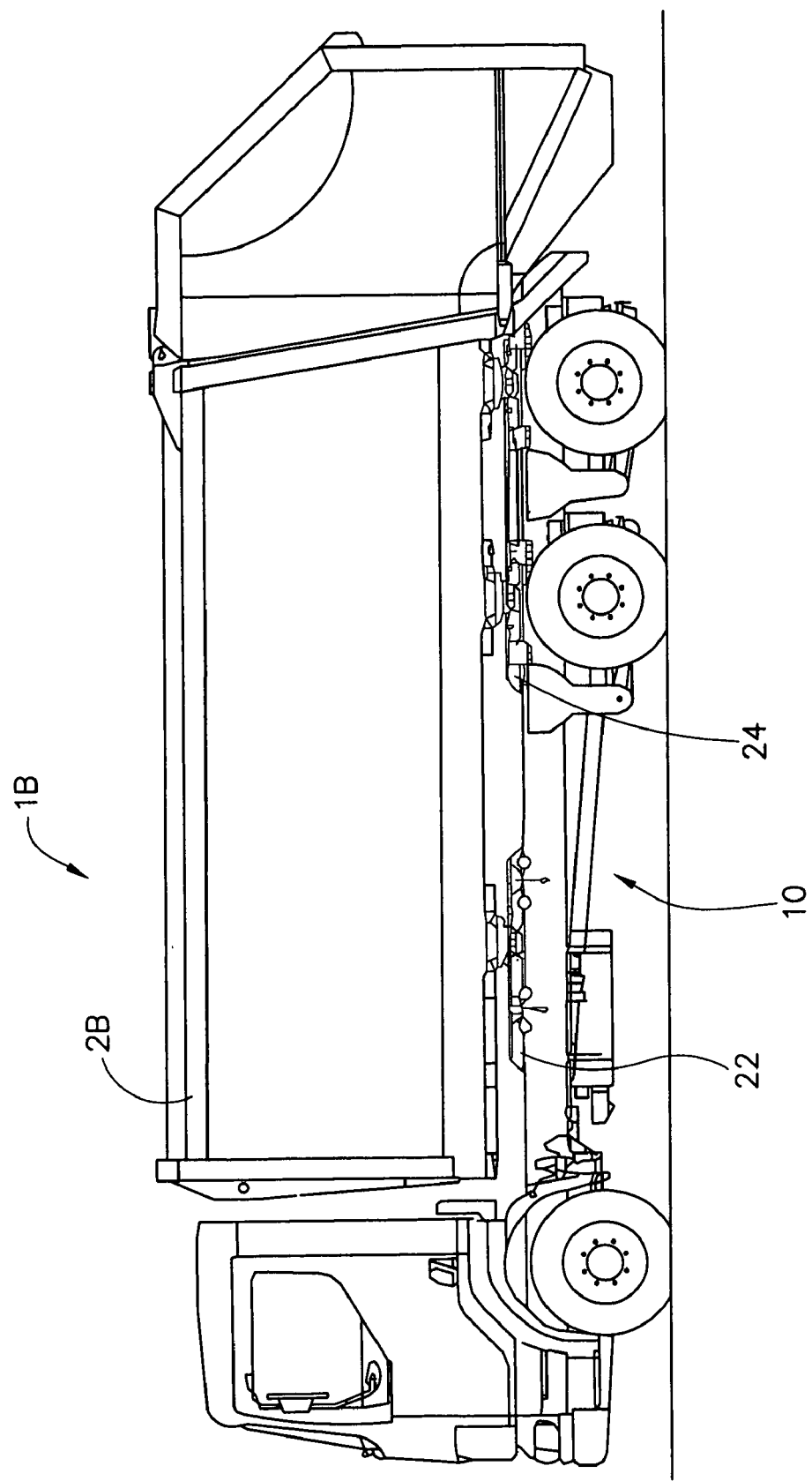
FIG. 1B is a side view of a front and rear sub assembly coupled to a vehicle chassis and container according to an exemplary embodiment.
Figure 2A:
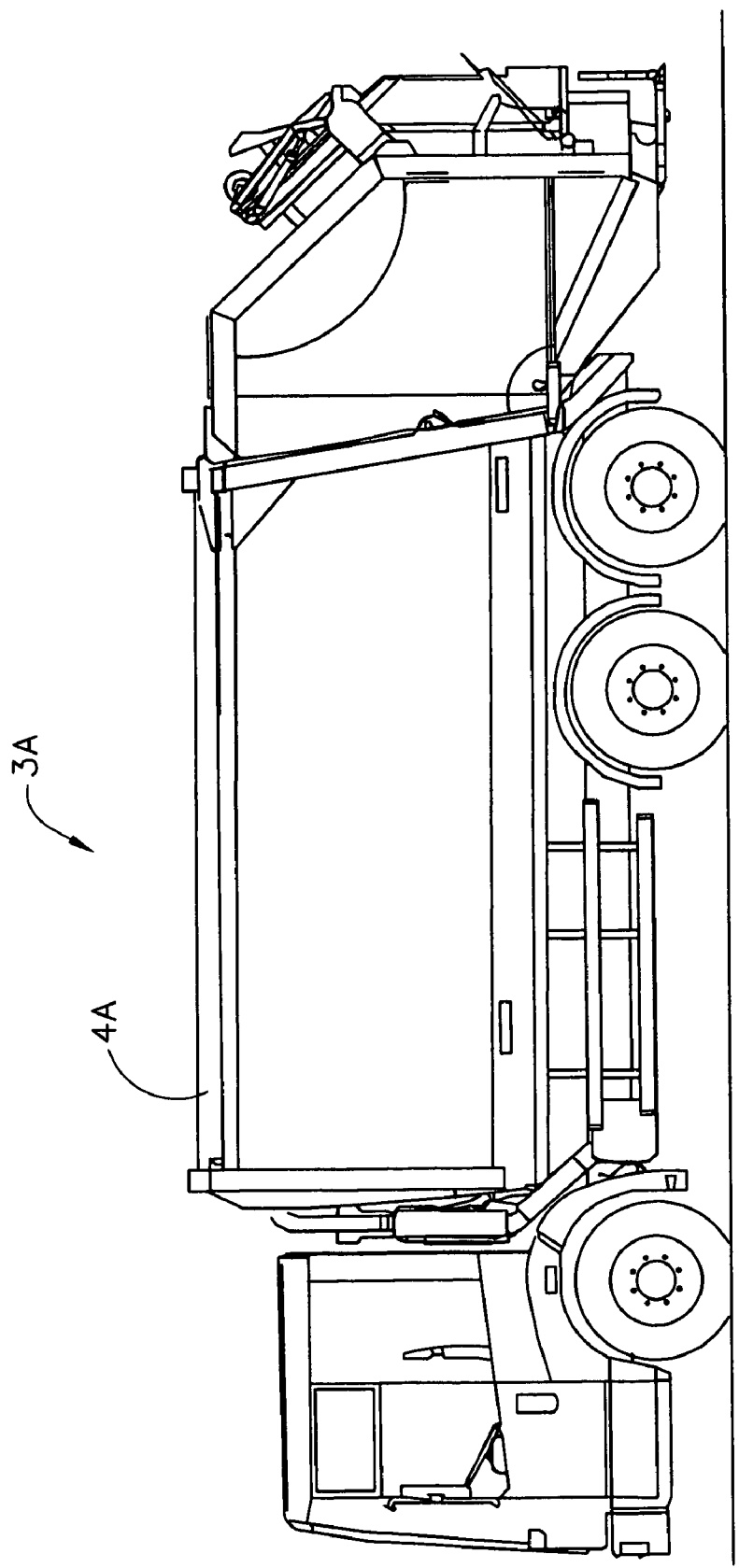
FIG. 2A is a side view of a rear loading truck comprising a load indication system.
Figure 2B:
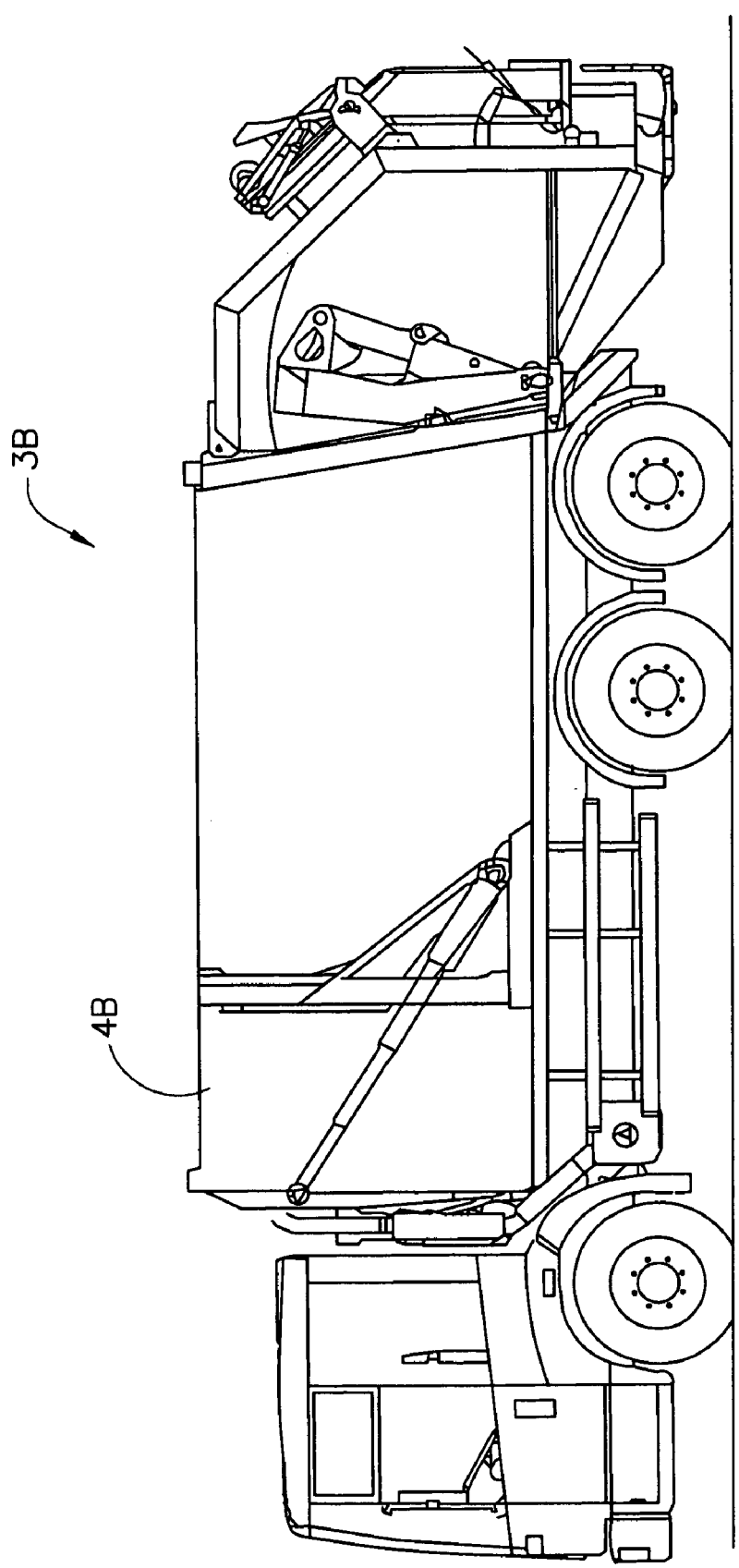
FIG. 2B is a side view of a rear loading truck comprising a load indication system.

Before explaining a number of exemplary embodiments of the invention in detail, it is to be understood that the invention is not limited to the details or methodology set forth in the following description or illustrated in the drawings. The invention is capable of other embodiments or being practiced or carried out in various ways. It is also to be understood that the phraseology and terminology employed herein is for the purpose of description and should not be regarded as limiting.

In general, the universal mounting system described in this disclosure comprises a sub frame assembly for attaching a material container to different vehicles each having a first and second generally parallel chassis member. The sub frame is intended to be configured for use with different vehicles having different spacings (e.g., chassis widths). According to various embodiments, the mounting system is intended to be used with any suitable vehicle used for container handling applications. For example, the mounting system may be used with cement trucks, waste hauling trucks (e.g., garbage trucks), dump trucks, tanks, etc. Typically, the vehicles comprise a plurality of axles and wheel assemblies. In addition, the vehicles generally include a motor coupled to the one or more of the axles for driving the axles. Similarly, the universal mounting system described herein is intended to be used with a wide variety of containers attachable to the vehicles by way of the mounting system. According to various exemplary embodiments, any suitable container may be used with the mounting system including roll-off containers, dump truck containers, waste hauling containers (e.g., for garbage), waste hauling boxes, etc. FIGS. 1A, 1B, 2A and 2B provide examples of different types of vehicles 1A, 1B, 3A, 3B and containers 2A, 2B, 4A, 4B that may be used with the mounting system of this disclosure (e.g., mounting system 10 including first and second sub frames 22, 24).

Figure 3:
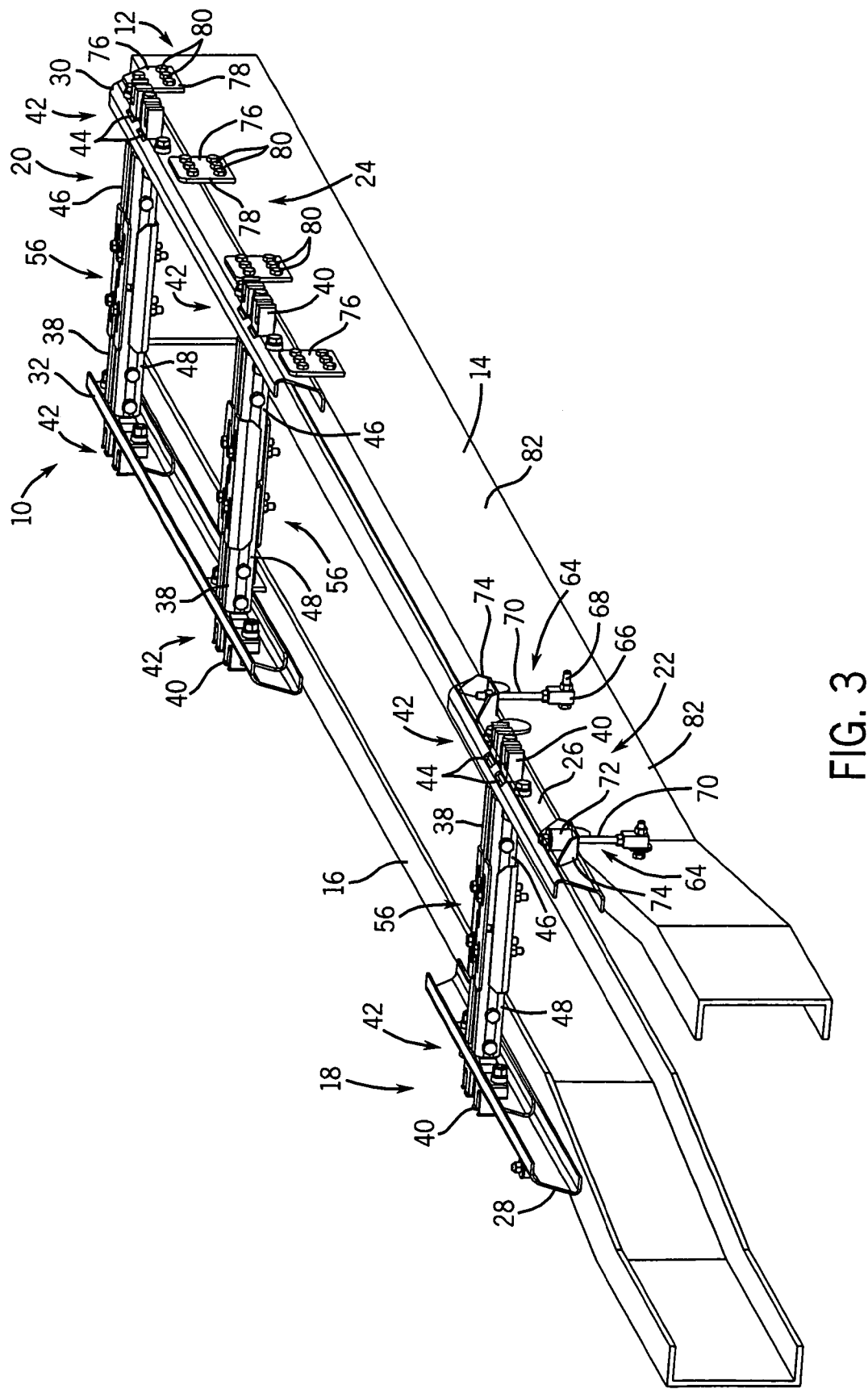
FIG. 3 is a front perspective view of a front and rear sub assembly coupled to a vehicle chassis according to an exemplary embodiment.
Figure 4:
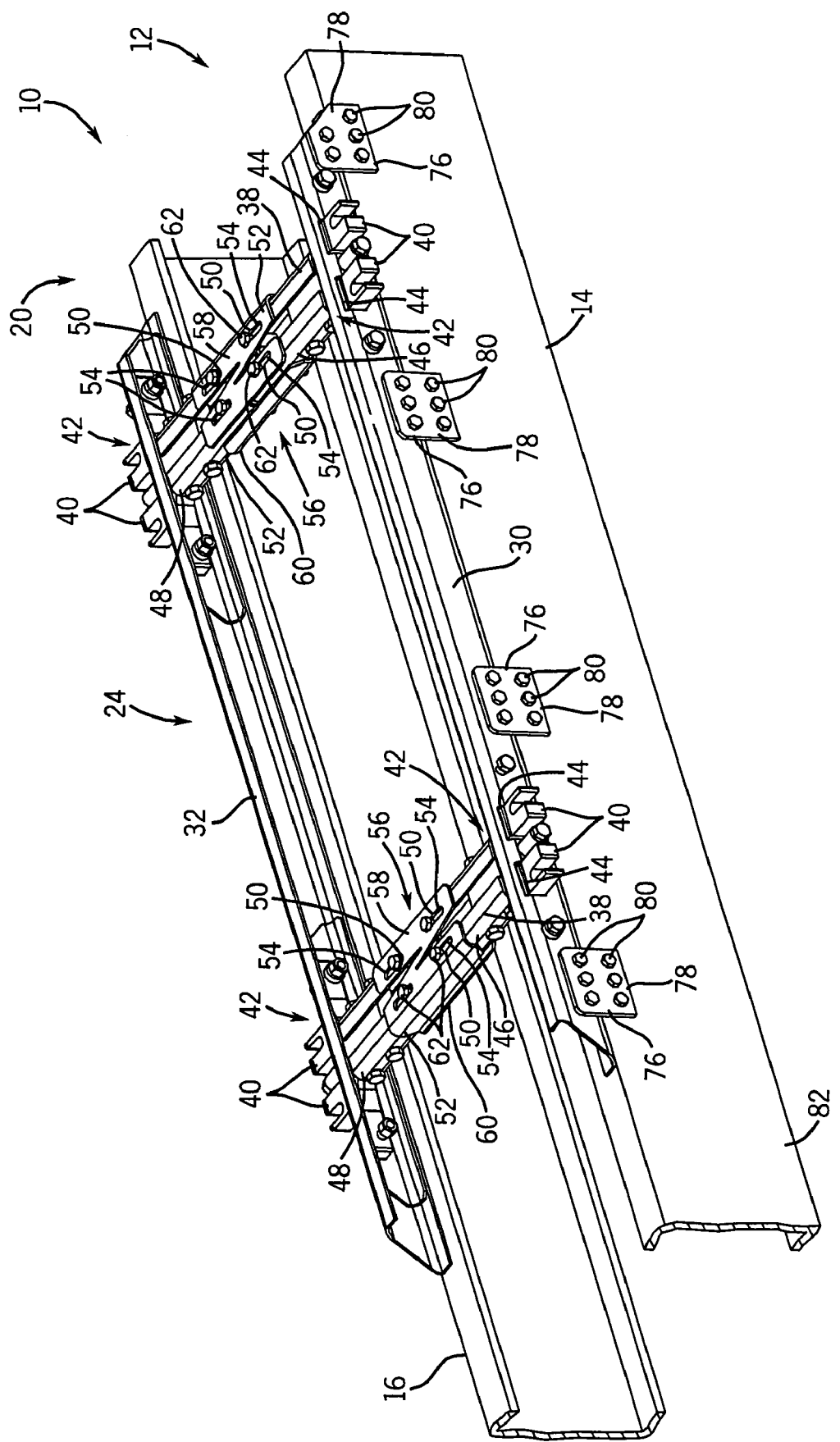
FIG. 4 is a front perspective view of a rear sub assembly coupled to a vehicle chassis according to an exemplary embodiment.

Referring to FIG. 3, a universal mounting system or assembly 10 is shown removably coupled to a chassis 12. Chassis 12 is shown having a first chassis member 14 and a second chassis member 16. First and second chassis members 14 and 16 are generally parallel to one another. Chassis 12 comprises a front end 18 (e.g., front) and a rear end 20 (e.g., rear). System 10 includes a first sub frame 22 positioned proximate front end 18 and a second sub frame 24 positioned proximate rear end 20.

Figure 6:
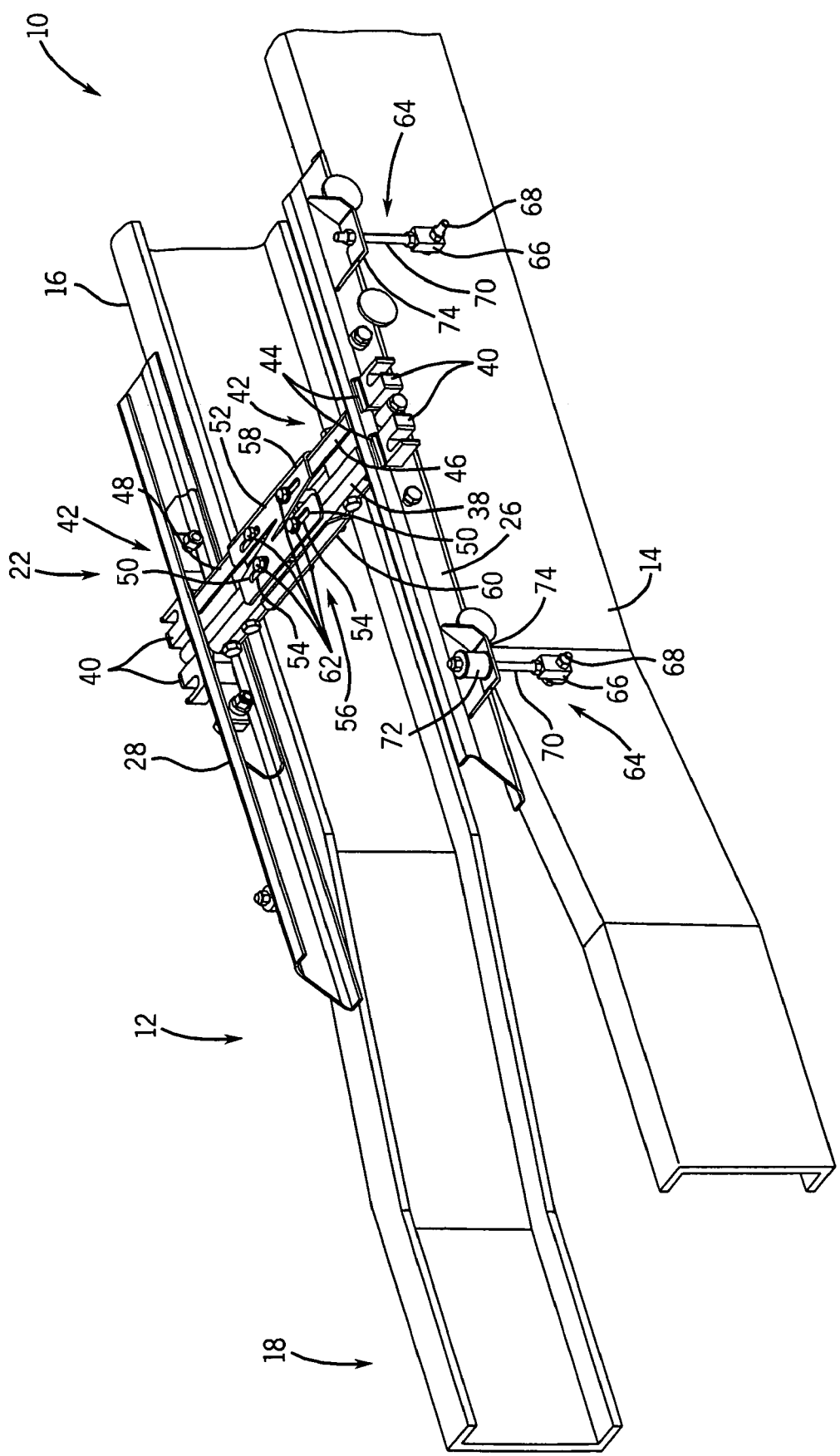
FIG. 6 is a front perspective view of a front sub assembly coupled to a vehicle chassis according to an exemplary embodiment.
Figure 7:
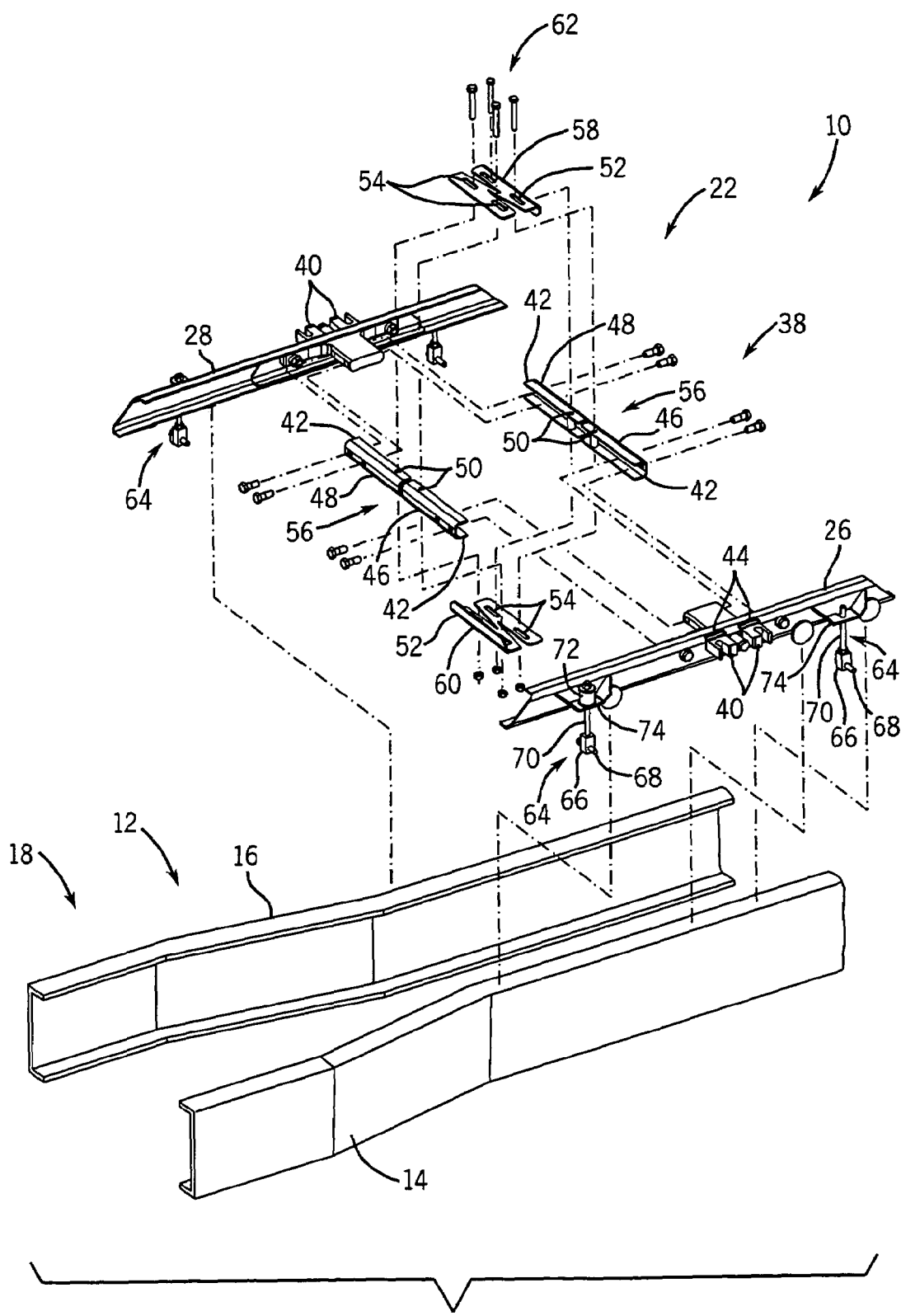
FIG. 7 is an exploded front perspective view of the front sub assembly according to an exemplary embodiment.
Figure 8:
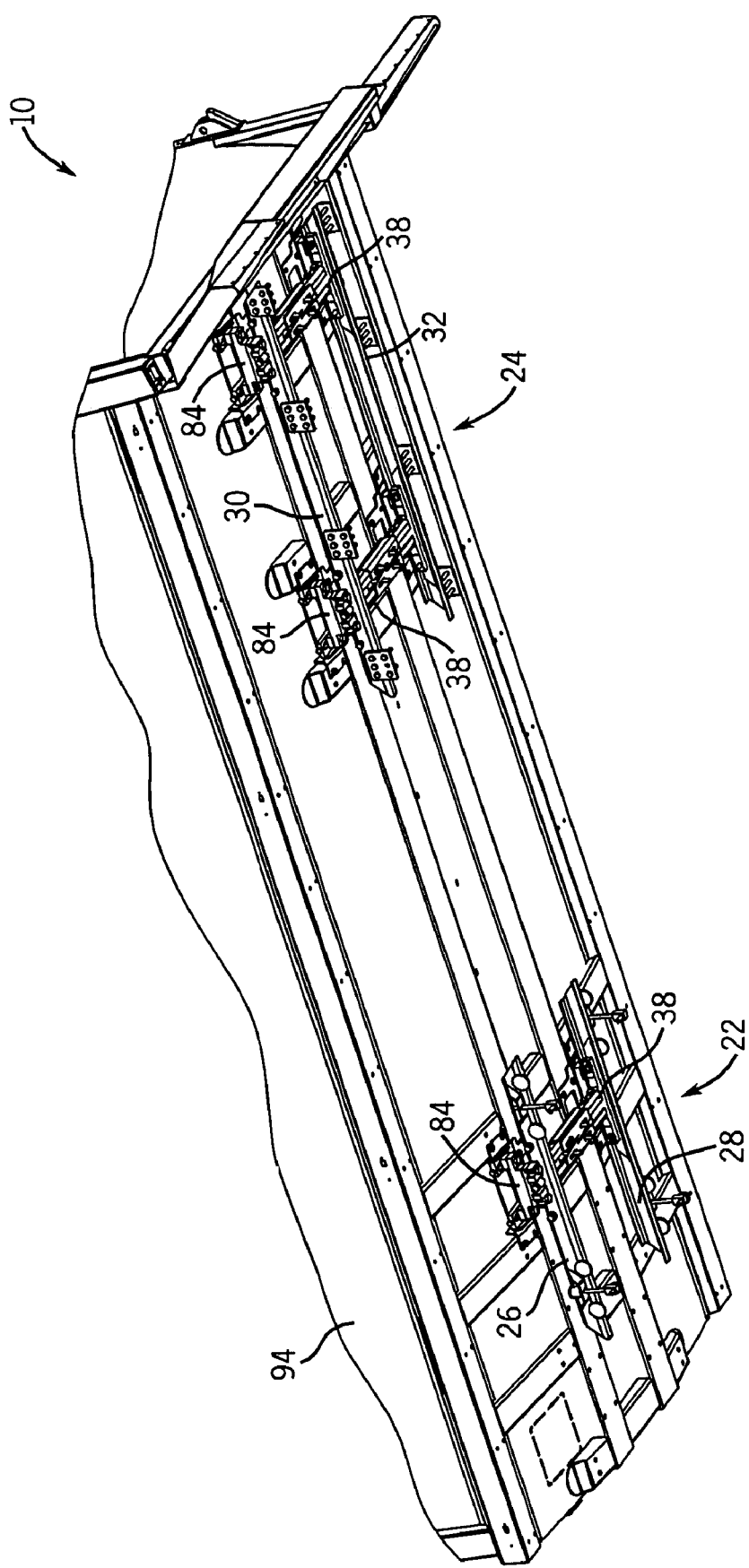
FIG. 8 is a lower perspective view of a mounting system according to an exemplary embodiment.
Figure 9:
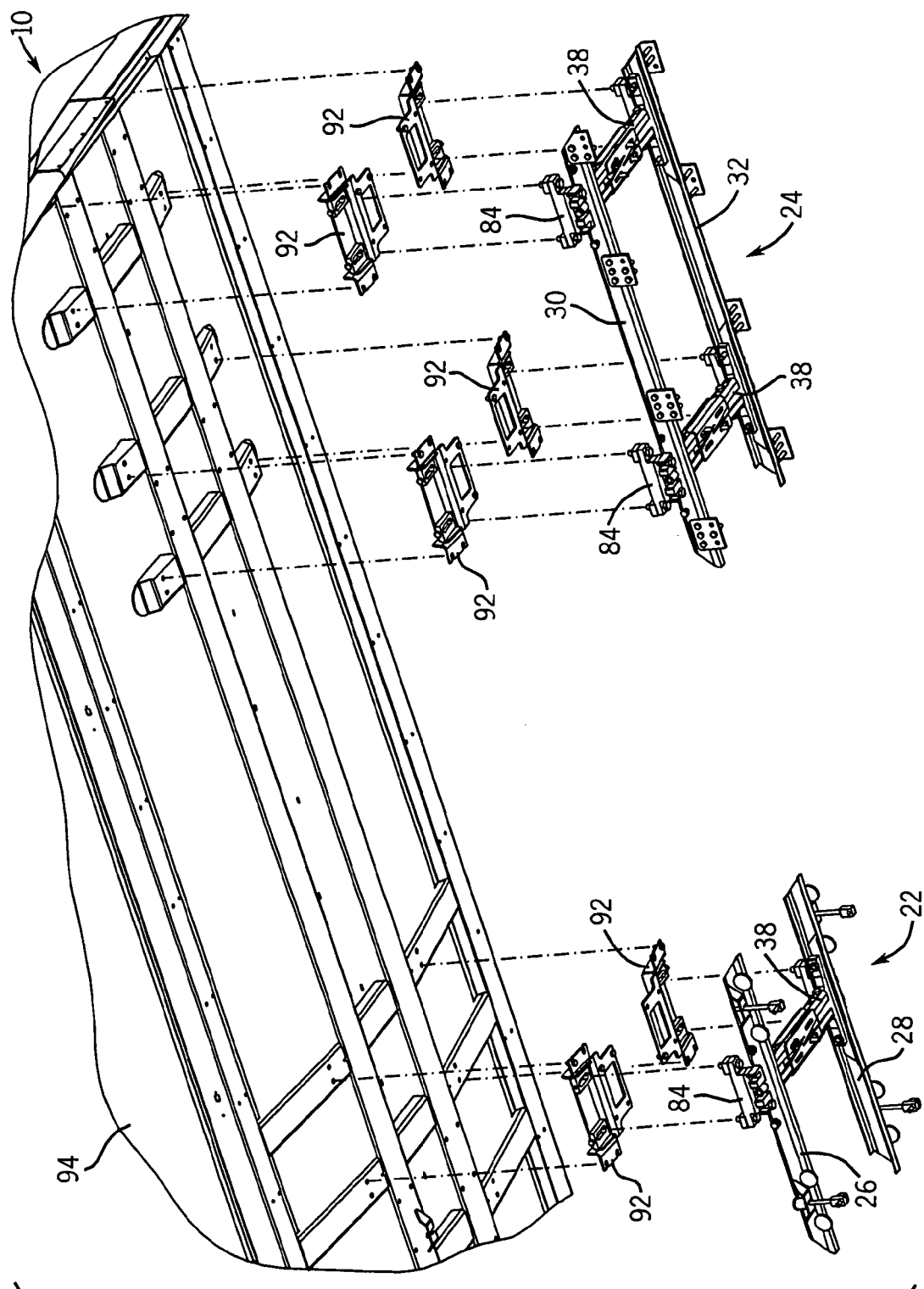
FIG. 9 is an exploded lower perspective view of the mounting system according to an exemplary embodiment.
Figure 10:
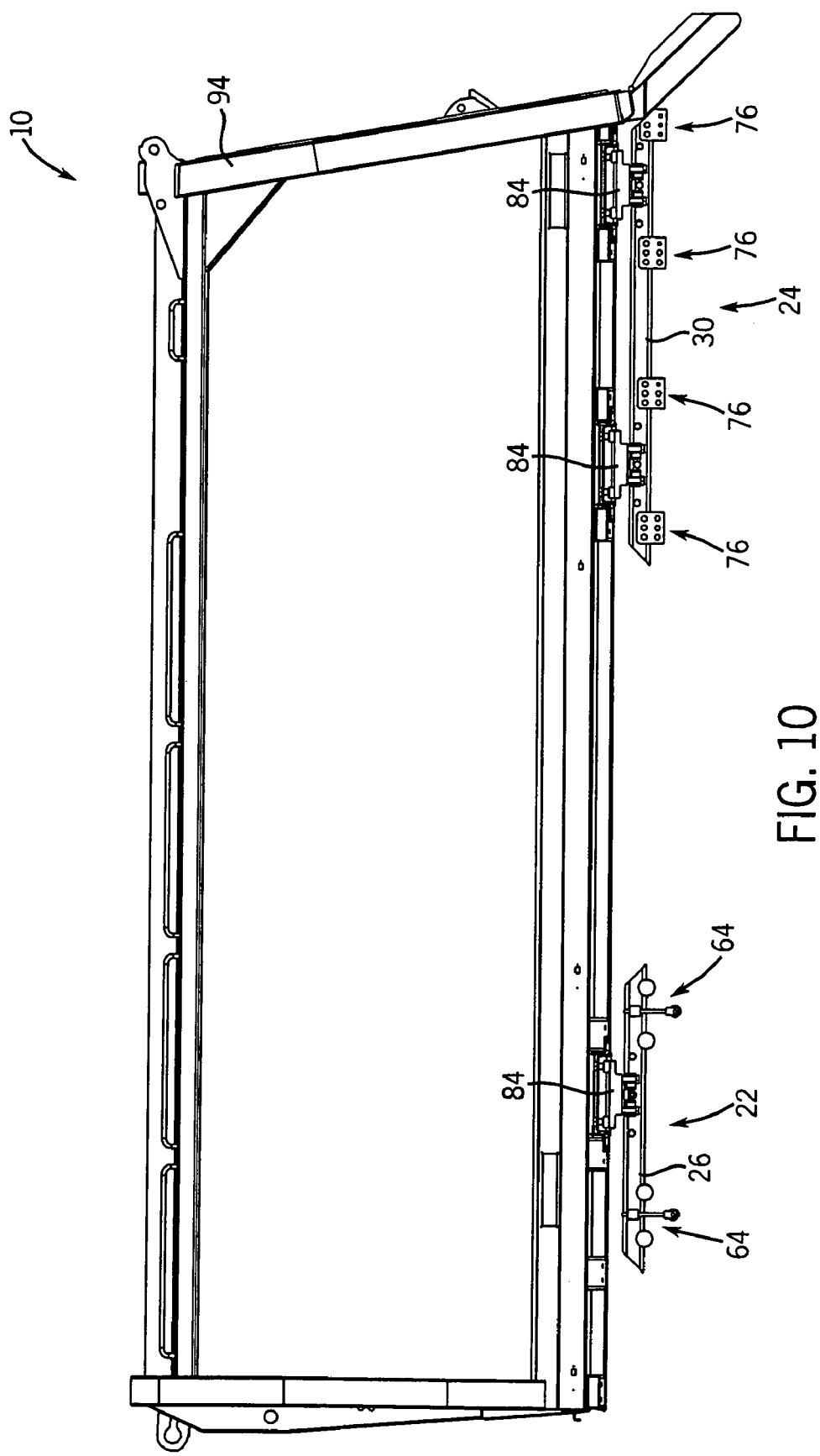
FIG. 10 is side view of the mounting system coupled to a container according to an exemplary embodiment.
Figure 11:
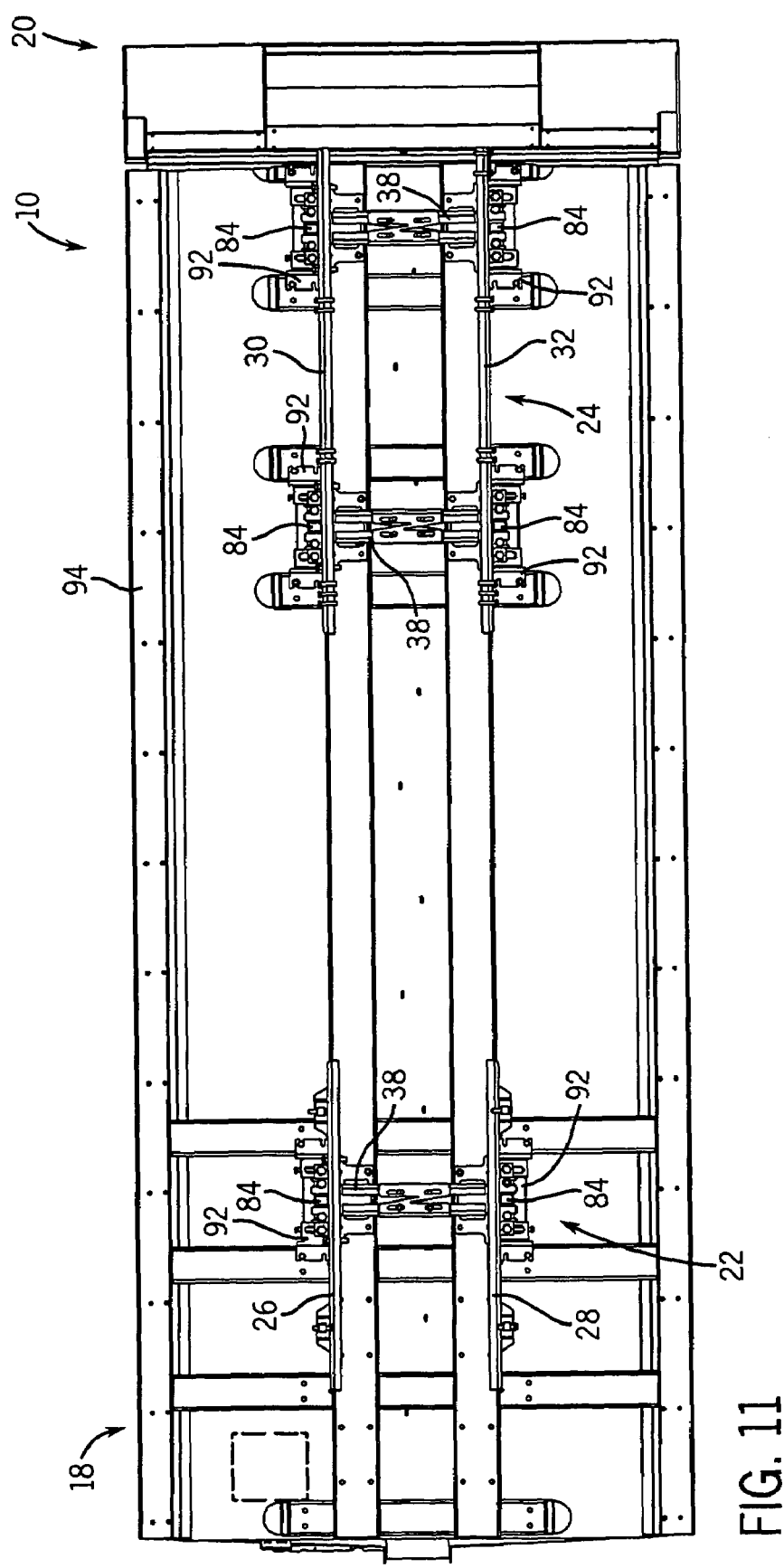
FIG. 11 is a bottom plan view of the mounting system coupled to a container according to an exemplary embodiment.
Figure 12:
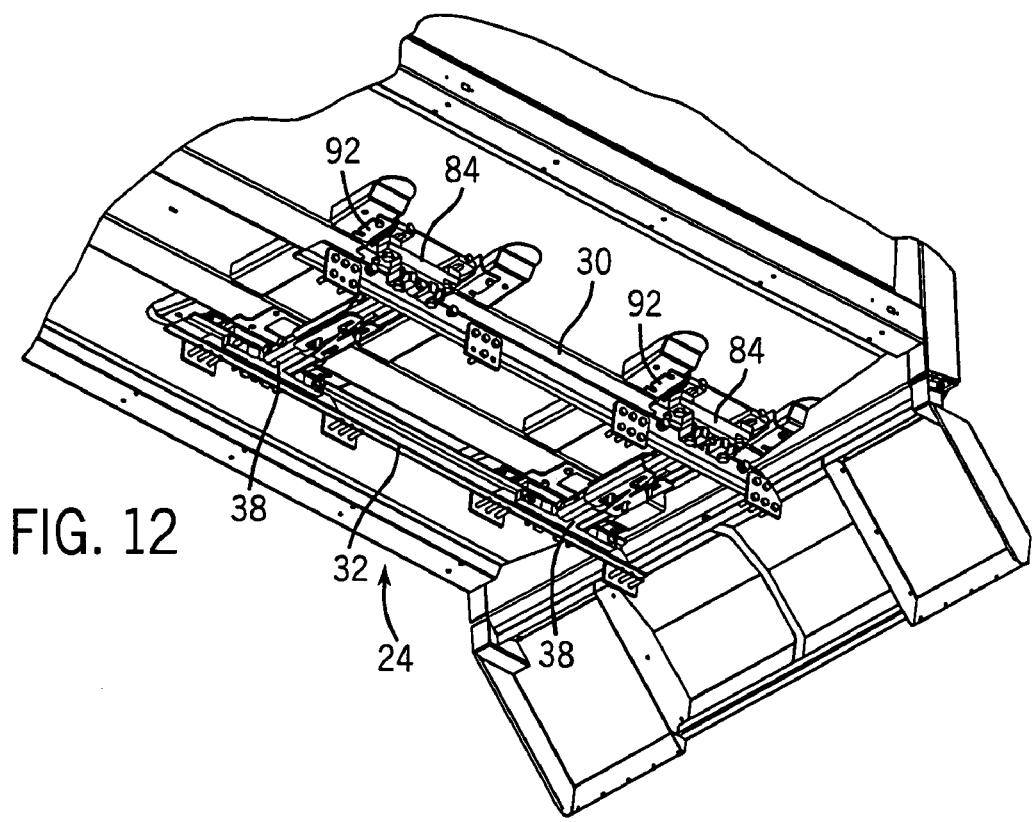
FIG. 12 is a lower perspective view of a rear sub frame coupled to a container according to an exemplary embodiment.
Figure 13:
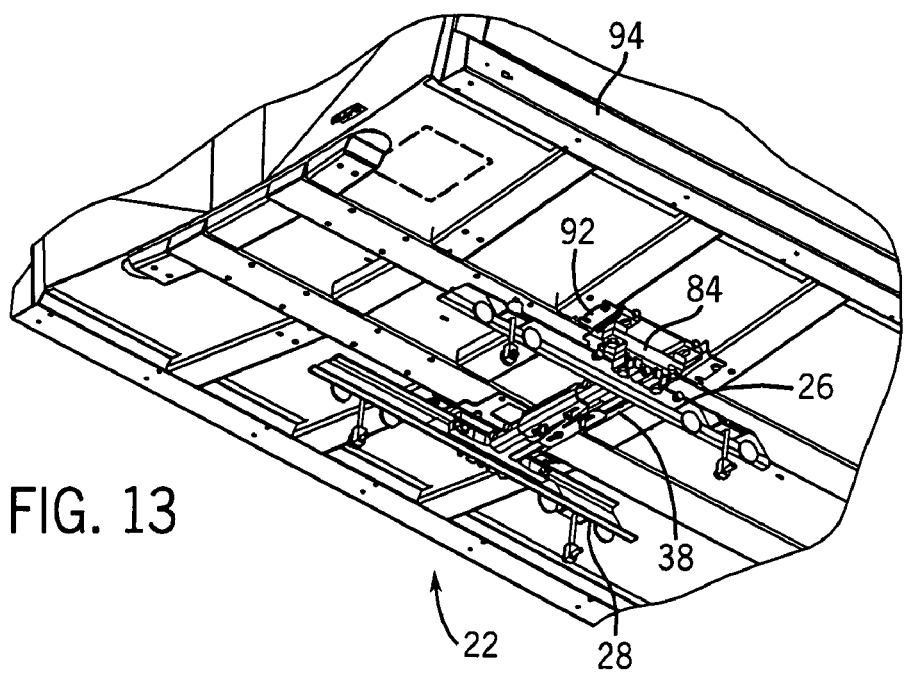
FIG. 13 is a lower perspective view of a front sub frame coupled to a container according to an exemplary embodiment.

As shown in FIGS. 3, 6–11, and 13, first sub frame 22 comprises a first frame rail 26 and a second frame rail 28. Each of first frame rail 26 and second frame rail 28 are associated with each of first and second chassis members 14 and 16. First and second frame rails 26 and 28 are coupled to corresponding chassis members 14 and 16 at connectors 64. As best shown in FIGS. 6 and 7, connectors 64 each include a mount 66, a shaft 70, a bearing 72, and a support 74. Mounts 66 are coupled to an outer side 82 of chassis members 14 and 16 with fasteners 68. According to an exemplary embodiment, fasteners 68 comprise threaded fasteners (e.g., bolts, screws, etc.). Shafts 70 are rotatably coupled to mounts 66 and extend through an opening in supports 74. The portions of shafts 70 extending through supports 74 are coupled to bearings 72 to allow for some torsional movement of first sub frame 22 relative to chassis 12. This configuration allows for a flexible mounting of first sub frame 22 to chassis 12. According to various alternative embodiments, the supports may be coupled to the frame rails according to any suitable method. For example, the supports may be coupled to the frame rails by welding, adhesives, fasteners, etc.

Referring to FIGS. 3, 4–5, and 8–12, second sub frame 24 includes a first frame rail 30 and a second frame rail 32. Each of first frame rail 30 and second frame rail 32 are associated with each of first and second chassis members 14 and 16. First and second frame rails 30 and 32 are coupled to corresponding chassis members 14 and 16 at connectors 76. Connectors 76 include substantially planar (e.g., flat) members 78 that are attached to an outer side 82 of chassis members 14 and 16 with fasteners 80. According to an exemplary embodiment, fasteners 80 comprise threaded fasteners (e.g., bolts, screws, etc.). According to various alternative embodiments, any suitable fastener, adhesive, and/or welding process may be used to attach connectors 76 to chassis members 14 and 16. Once connectors 76 are coupled to chassis members 14 and 16, members 78 are in position to make direct contact with first and second frame rails 30 and 32 to provide support to sub frame 24 and resist movement of sub frame 24 during operation of the vehicle.

Figure 14:
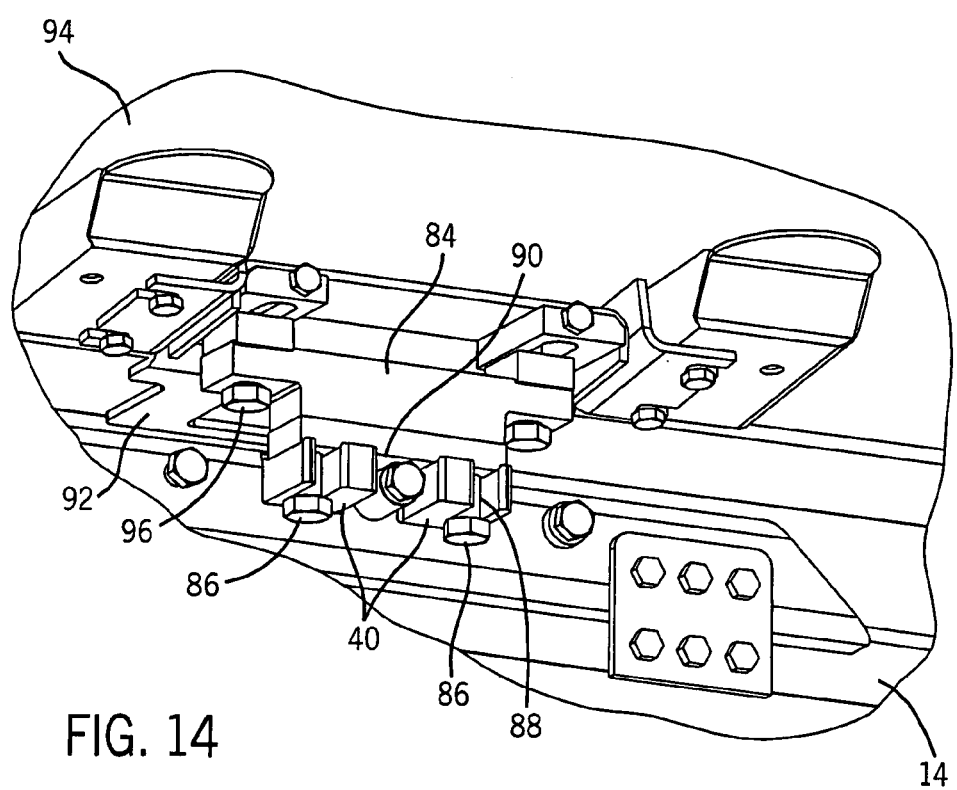
FIG. 14 is a detailed view of a load cell coupled to a container and frame rails of a sub assembly according to an exemplary embodiment.

Referring to FIGS. 3–13, first sub frame 22 and second sub frame 24 comprise a plurality of cross members 38. According to an exemplary embodiment, first sub frame 22 comprises two cross members 38 and second sub frame 24 comprises four cross members 38. According to various alternative embodiments, any suitable number of cross members may be used. Cross members 38 are configured to hold frame rails 26, 28 and 30, 32 in a generally fixed relationship and adjustably space frame rails 26, 28 and 30, 32 at a distance which corresponds to the spacing of chassis members 14 and 16. Cross members 38 comprise mounts 40 supported on the outside of frame rails 26, 28 and 30, 32 at outboard ends 42 of cross members 38. Mounts 40 are intended to support and attach containers to vehicles used with system 10. According to an exemplary embodiment, mounts 40 are portions of respective cross members 38 which extend through respective frame rails 26, 28 and 30, 32 at openings 44. As best shown in FIG. 14, mounts 40 are U-shaped members and are arranged for attaching load cells 84 to a respective mount 40 and permit adjustment of a load cell 84 relative to its respective mount 40. The adjustability of mounts will be discussed in greater detail below.

Figure 5:
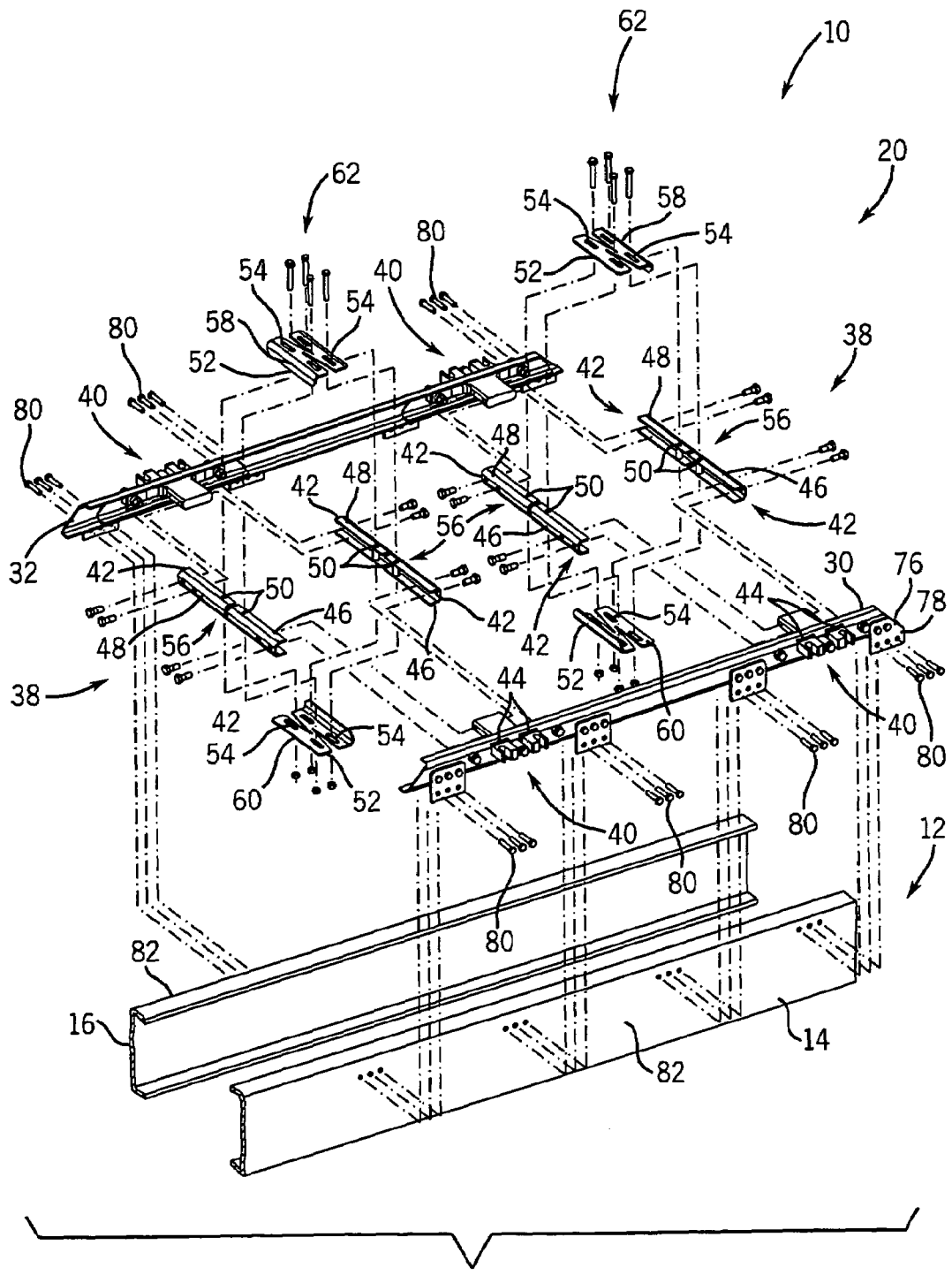
FIG. 5 is an exploded front perspective view of the rear sub assembly according to an exemplary embodiment.

Referring to FIGS. 3–13, cross members 38 comprise portions 46 and 48 which are adjustable relative to one another. Being adjustable relative to one another allows portions 46 and 48 to adjust the distance between frame rails 26, 28 and 30, 32. Portions 46 and 48 are configured to be adjustable until a desired distance between frame rails 26, 28 and 30, 32 is obtained. Once the desired distance is established, portions 46 and 48 may be fixedly coupled relative to one another. As shown in FIGS. 5 and 7, portions 46 and 48 include apertures 50 configured to receive a fastener. Brackets 52, or the like, having slots 54 that correspond to apertures 50 of portions 46 and 48 are placed over ends 56 of portions 46 and 48. A first bracket 58 may be placed against an upper surface of portions 46 and 48 and a second bracket 60 may be placed against a lower surface of portions 46 and 48. First and second brackets 58 and 60 may also be rounded, curved, and/or bent at one or more corners thereby corresponding to the shape of portions 46 and 48. Once brackets 52 are placed over and/or against portions 46 and 48, apertures 50 of portions 46 and 48 and brackets 52 are aligned for receiving fasteners, such as bolts 62. Bolts 62 are placed into apertures 50 and 54 to fixedly couple portions 46 and 48 together. Bolts 62 may be tightened using nuts or the like. According to an exemplary embodiment shown in FIGS. 3 and 5, two portions 46 and two portions 48 are couple together to form cross member 38. According to various other exemplary embodiments, any number of portions may be used to form members 38. As shown in the FIGURES, ends 42 of portions 46 and 48 are fixedly coupled to frame rails 26, 28 and 30, 32. Bolts 62 engage various portions of frame rails 26, 28 and 30, 32, cross members 38, and/or other elements to fix them relative to one another.

According to an exemplary embodiment, ends 42 are welded to frame rails 26, 28 and 30, 32 once mounts 40 are positioned through openings 44 of frame rails 26, 28 and 30, 32. According to another exemplary embodiment shown in FIGS. 3–7, ends 42 may be coupled to mounts 40 by way of fasteners (e.g., bolts) or the like. In addition to cross members 38, first sub frame 22 may also comprise cross bars for further support and positioning of first sub frame 22 relative chassis members 14 and 16. Additional cross bars may help absorb torsional loads applied to the system and maintain the generally rectangular shape of the sub frame mounting.

According to various alternative embodiments, any suitable means for adjusting the distance between the frame rails may be used. For example, other types of slidable portions may be utilized. According to an alternative embodiment, one portion or member may be configured to slide at least partially within the other portion or member. For example one member may slide within a channel formed in the other member until locked in place. According to an alternative embodiment, one member may be positioned entirely within the other member (e.g., a telescoping arrangement). The inner member may then be moved relative to the outer member until the desired configuration is obtained. The portions may then be fixed relative to one another by clamps, hooks, pins, etc. Similarly, one member may be slidably coupled to a track or glide (e.g., by way of a wheel, groove, etc.) for movement relative to a fixed member. Once the slidable member is positioned so that the frame rails are spaced at a desired distance, the slidable member can be locked in a fixed position according to any suitable means.

According to an exemplary embodiment as shown in FIG. 14, system 10 comprises load cell 84 which is configured to generate a signal representative of load applied by a container mounted on the vehicle. Load cell 84 is included as part of a load indication system which comprises a plurality of electronic load cells. The load indication system is coupled to a vehicle and is configured to measure the load on the vehicle. The load indication system is operably connected to a control system to provide load information for controlling a hydraulic system for operation of the container. According to an exemplary embodiment, the load indication system is configured to provide an indication of load on at least one axle and the total load on a rear loaded vehicle. According to alternative embodiments, any suitable type of vehicle may be used with the load indication system. For example, a vehicle having an adjustable sub frame, a constant width sub frame, etc. may be used. In general, the system may operate with a vehicle comprising a push out panel for generally emptying the container and compacting refuse against. The vehicle may also include a compacting mechanism configured to compact refuse against push out panel. The vehicle may also be equipped with a lifting device for substantially emptying refuse bins into the container.

Referring to FIG. 14, load cell 84 is coupled to mounts 40 by way of fasteners 86. According to a preferred embodiment as shown in the FIGURES, fasteners 86 are bolts. According to various alternative embodiments, the fasteners may be any suitable attachment means (e.g., screws, clamps, hooks, etc.) Referring back to FIG. 14, fasteners 86 are threaded through mounts 40 and apertures 88 located on an undersurface 90 of cells 84. According to an exemplary embodiment, mounts 40 may be configured to include one or more attachment arrangements for attaching mounts 40 and permitting adjustment of each load cell 84 relative to a respective mount 40. Mounts 40 are at least partially adjustable so that cells 84 may be positioned according to the needs associated with a particular container and/or vehicle. For example, the mounts may be positioned to couple with the load cells at varying distances from the sides of the chassis members 14 and 16 (e.g., the mounts may adjustably extend generally outward in a substantially perpendicular direction to the outer surface of the chassis members). According to various alternative embodiments, the mounts may be adjusted in other directions other than in a substantially perpendicular direction to the outer surface of the chassis members (e.g., at an angle relative to the chassis). In addition, the fasteners may be adjusted and coupled to the mounts at different locations along the u-shaped apertures in the mounts. For example, the fasteners may be positioned near the curved surfaces of the u-shapes of the mounts as well as near the open portions of the u-shapes of the mounts.

As shown in FIG. 14, load cells 84 may be coupled to connectors 92 which are configured to couple with various containers. Connectors 92 include attachment arrangements for attaching the load cells to the container and permitting adjustment of each load cell relative to the container. As shown in FIG. 14, connectors 92 are coupled to container 94 by way of fasteners 96 (e.g., bolts, screws, etc.). According to various exemplary embodiments, the shape and configuration of the connectors, mounts and system may vary according to the different types of containers and vehicles used.

System 10 may be used with various vehicles and containers suitable for holding materials. Each sub frame 22 and 24 spread the load of the container over the chassis. Load cells 84 provide a means of determining the weight of the load from the materials held in the container in order to manage the overall forces applied to the chassis. Load cells 84 are intended to measure the load on one individual axel in addition to the overall load on the vehicle. As refuse is collected, the weight on the axle(s) and the chassis may be determined, thereby providing an indication of how much weight may still be loaded into the vehicle container. The placement of mounts 40 on the sides of chassis members 14 and 16 helps reduce the overall height of the system. For example, some conventional systems provide mounts on top of the chassis which can increase height and result in a higher center of gravity. The lower mounts help provide a lower center of gravity for the vehicles.

As described above, the vehicles include a motor coupled to one or more axle and wheel assembly such that the motor is configured to drive the axle. In addition, the vehicle may comprise a control system and a hydraulic system having one or more hydraulic operators associated with various operations. The hydraulic system may be configured for lifting, tipping and/or compacting the collected refuse. The control system may include sensors and actuators to control the hydraulic system and activate the valves as needed. A variable displacement hydraulic pump may be coupled to the motor and a valve assembly may be included to couple the pump to the one or more hydraulic operators. The valve assembly is configured to automatically divert fluid flow from one of the operators to another of the operators when the power required by the operators exceeds the power amount which the pump can deliver when the motor is delivering the maximum power available form the motor to the pump. The hydraulic system may further comprise a load dependent adjustable hydraulic system having a load dependent function that comprises a compaction operation and a counter pressure operation. The load dependent function is configured to control the hydraulics in a proportional mode to adjust refuse density in the container to prevent overloading of an axle. By connecting the control system and the load indication system, the push out panel may be moved toward the front of the container when the load indication system detects too much weight over an axel (e.g., rear axel). The push out panel is configured to move toward the front of the container so that the center of gravity of the collected refuse is moved toward the front of the container thereby relieving the load on the overloaded axel. According to various exemplary embodiments, the motor may be combustible, electrical, etc.

According to various exemplary embodiments, the assemblies and components of the system 10 may be constructed from various different materials. According to a preferred embodiment, the assemblies and components of the system are constructed from materials that are durable and substantially non-corroding. For example, the sub frame components may be made from metal, alloys, steel, composites, etc. In addition, various parts of the system may be constructed and assembled as a single integrally formed piece or may be assembled and constructed from multiple parts.

It is important to note that the above-described embodiments are illustrative only. Although the invention has been described in conjunction with specific embodiments thereof, those skilled in the art will appreciate that numerous modifications are possible without materially departing from the novel teachings and advantages of the subject matter described herein. For example, different types of fasteners may be used in addition to or instead of the bolts as described herein. In addition, the sub frames may couple to the chassis at different locations or according to different configurations. Further, any suitable number of sub frames may be used (e.g., one, three, five, etc.). Accordingly, these and all other such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangements of the preferred and other exemplary embodiments without departing from the spirit of the present invention.

What is claimed is:

1. A vehicle comprising:
at least one driven axle and wheel assembly;
a motor coupled to the at least one axle for driving the at least one axle;
a chassis having at least a first chassis rail and a second chassis rail supported relative to the at least one axle, the first chassis rail being generally parallel to the second chassis rail;
at least one sub frame unit comprising a first frame rail associated with the first chassis rail and a second frame rail associated with the second chassis rail, the at least one sub frame unit further comprising at least one cross member attached to the first and second frame rails to hold the first and second frame rails in a generally fixed relationship in which the first and second frame rails rest upon the first and second chassis rails respectively, the at least one cross member comprising container mounts supported on the outside of the first and second frame rails at outboard ends of the at least one cross member; and
a container configured to contain material attached to the at least one sub frame unit by way of the at least one cross member, wherein the first and second frame rails are attached to the first and second chassis rails to permit desired motion of the chassis rails during operation;

wherein the at least one cross member extends through the respective first and second frame rails.

2. The vehicle of claim 1, wherein the at least one cross member has a length that is adjustable for associating the first and second frame rails with the first and second chassis rails.

3. The vehicle of claim 2, wherein the vehicle is a refuse collection vehicle.

4. The vehicle of claim 3, further comprising at least four electronic load cells configured to generate a signal representative of load applied to each cell, each of the load cells connecting a respective mount to the container.

5. The vehicle of claim 4, further comprising attachment arrangements for attaching the load cells to the container and permitting adjustment of each load cell relative to the container.

6. The vehicle of claim 5, further comprising attachment arrangements for attaching the load cells to their respecting mounts and permitting adjustment of each load cell relative to their respective mounts.

7. The vehicle of claim 4, wherein the at least one cross member comprises two portions slidable relative to each other to permit adjustment of the distance between the first and second frame rails and a fixing arrangement between the portions which fixes the portions relative to each other when a desired distance between the first and second frame rails is established.

8. A material hauling vehicle comprising:
at least one driven axle and wheel assembly;
a motor coupled to the axle for driving the axle;
a chassis having at least a first chassis rail and a second chassis rail supported relative to the at least one axle, the first chassis rail being generally parallel to and spaced apart in a lateral direction from the second chassis rail;
a sub frame having at least a first frame rail associated with the first chassis rail and a second frame rail spaced apart from the first frame rail in the lateral direction and associated with the second chassis rail;
at least one cross member having a length and attached between the first and second frame rails to hold the first and second frame rails in a generally fixed relationship in which the first and second frame rails rest upon the first and second chassis rails; and
a container configured to contain material attached to the sub frame, wherein the frame rails are attached to the chassis rails to permit transportation of the container by the vehicle and also generally permit desired motion of the chassis rails during operation of the vehicle, and wherein the length of the at least one cross member is selectively adjustable to adjust the lateral spacing between the first and second frame rails depending upon the lateral spacing between the first and second chassis rails.

9. The vehicle of claim 8, wherein the at least one cross member comprises a first cross member and a second cross member, the vehicle further comprising:
first and second container mounts supported on the outside of the first and second frame rails at the outboard ends of the first cross member;
third and fourth container mounts supported on the outside of the first and second frame rails at the outboard ends of the second cross member, wherein the container is attached to the first, second, third and fourth container mounts.

10. The vehicle of claim 9, wherein the first, second, third and fourth container mounts are portions of the respective cross members which extend through the respective frame rails.

11. The vehicle of claim 10, further comprising at least four electronic load cells configured to generate a signal representative of load applied to each cell, each of the load cells connecting a respective container mount to the container.

12. The vehicle of claim 11, further comprising attachment arrangements for attaching the load cells to the container and permitting adjustment of each load cell relative to the container.

13. The vehicle of claim 12, further comprising attachment arrangements for attaching the load cells to their respective container mounts and permitting adjustment of each load cell relative to their respective container mounts.

14. The vehicle of claim 8, wherein the at least one cross member comprises two portions slidable relative to each other to permit adjustment of the lateral spacing between the first and second frame rails and a fixing arrangement between the portions which fixes the portions relative to each other when a desired lateral spacing between the first and second frame rails is established.

15. The vehicle of claim 14, wherein the portions of the at least one cross member are welded to the first and second frame rails after the desired lateral spacing between the first and second frame rails is established.

16. The vehicle of claim 14, wherein the fixing arrangement includes a plurality of bolts engaged with the portions to fix them relative to each other.

17. The vehicle of claim 8, further comprising:
at least a first and second hydraulic operator associated with a respective first and second operation;
a variable displacement hydraulic pump coupled to the motor; and
a valve assembly which couples the pump to the hydraulic operators, wherein the valve assembly is configured to automatically divert fluid flow from one of the operators to another of the operators when the power required by the operators exceeds the power amount which the pump can deliver when the motor is delivering a maximum power available from the motor to the pump.

18. The vehicle of claim 8, wherein the motor is a combustion engine.

19. The vehicle of claim 8, wherein the motor is an electric motor.

20. A sub frame assembly for attaching a material container to different vehicles each having a first and second generally parallel chassis rails wherein the first and second chassis rails of the different vehicles have different spacings, the sub frame assembly comprising:
at least a first and second frame rail configured to be associated with the first and second chassis rails respectively;
at least a first and second cross member attached to the first and second frame rails to hold the first and second frame rails in a generally fixed relationship, wherein the first and second cross members are configured to space the first and second frame rails at a distance which corresponds to the spacing between the first and second chassis rails of a respective vehicle;

first and second container mounts supported on the outside of the first and second frame rails at the outboard ends of the first cross member; and third and fourth container mounts supported on the outside of the first and second frame rails at the outboard ends of the second cross member, wherein the container mounts are configured to receive the material container, and wherein the first and second cross members adjustably space the first and second frame rails.

21. The assembly of claim 20, wherein the container mounts are portions of the respective cross members which extend through the respective frame rails.

22. The assembly of claim 21, wherein the container mounts include attachment arrangements for attaching a load cell to the respective container mounts and permit adjustment of the load cell relative to their respective container mount.

23. The assembly of claim 21, wherein the first and second cross members each include two portions slidable relative to each other to permit adjustment of the distance between the first and second frame rails and a fixing arrangement between the portions which fixes the portions relative to each other when a desired distance between the first and second frame rails is established.

24. The assembly of claim 23, wherein the portions of the first and second cross members are welded to their respective frame rails.

25. The assembly of claim 24, wherein the fixing arrangement includes a plurality of bolts engaged with the portions to fix them relative to each other.

26. A method for producing an adjustable sub frame assembly for attaching a material container to different vehicles each having a chassis with a different spacing between a first chassis rail and a second chassis rail comprising:

providing a first frame rail and a second frame rail associated with the first chassis rail and the second chassis rail;

providing a first cross member and a second cross member attached to the first frame rail and the second frame rail;

providing a first mount and a second mount on an outer portion of the first frame rail for supporting the container;

providing a third mount and a fourth mount on an outer portion of the second frame rail for supporting the container; and configuring the first cross member and the second cross member to hold the first frame rail and the second frame rail in a generally fixed relationship and adjustably space the first frame rail and the second frame rail at a distance that corresponds to the spacing between the first chassis rail and the second chassis rail.

27. The method of claim 26, further comprising providing the mounts and cross members as separate parts.

28. The method of claim 26, further comprising providing the mounts as integral parts of the first and second cross members.

29. The method of claim 28, further comprising configuring the mounts to extend through the first frame rail and the second frame rail.

30. The method of claim 29, further comprising configuring the mounts to include attachment arrangements for attaching load cells to the respective mounts and permit adjustment of a load cell relative to a respective mount.

31. The method of claim 30, further comprising configuring the first cross member and the second cross member to include separate portions that are slidable relative to one another to permit adjustment of the spacing between the first chassis rail and the second chassis rail.

32. The method of claim 31, further comprising configuring the first cross member and the second cross member to include a fixing arrangement that fixes the portions relative to one another.

33. The method of claim 32, further comprising providing fasteners to fix the portions relative to one another.

34. The method of claim 32, further comprising providing a container for material and configuring the container to attach to the sub frame.

35. The method of claim 34, further comprising providing electronic load cells configured to generate a signal representative of load applied to each cell, each of the load cells connecting a respective mount to the container.

36. The method of claim 35, further comprising providing a vehicle having a chassis and a motor, the chassis being coupled to the sub frame.

* * * * *